E. F. NORELIUS.
TRANSMISSION MECHANISM.
APPLICATION FILED NOV. 8, 1918.

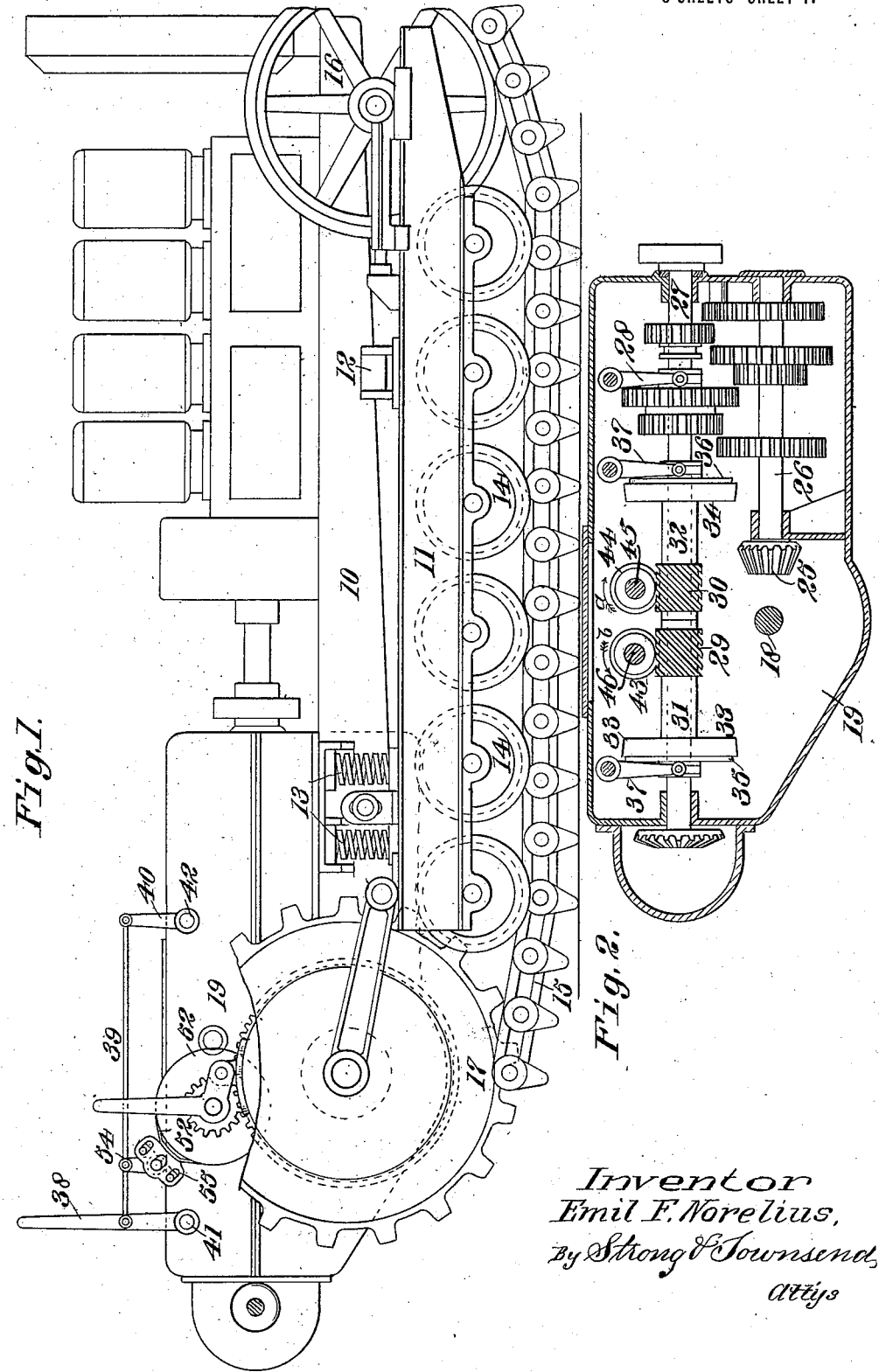

1,356,734.

Patented Oct. 26, 1920.
3 SHEETS—SHEET 2.

Inventor
Emil F. Norelius
By Strong & Townsend
attys

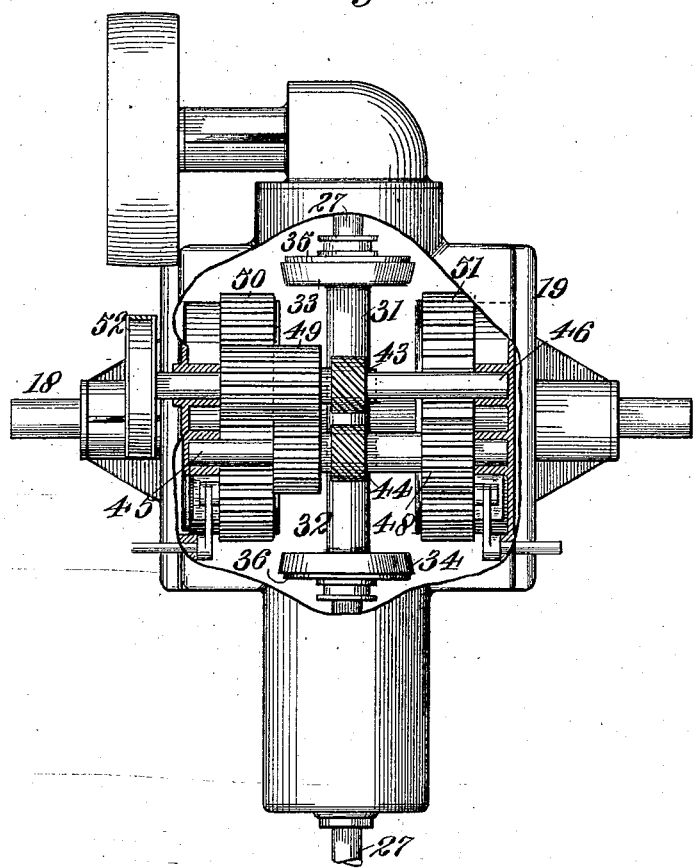

UNITED STATES PATENT OFFICE.

EMIL F. NORELIUS, OF PEORIA, ILLINOIS, ASSIGNOR TO THE HOLT MANUFACTURING COMPANY, OF STOCKTON, CALIFORNIA, A CORPORATION OF CALIFORNIA.

TRANSMISSION MECHANISM.

1,356,734.   Specification of Letters Patent.   Patented Oct. 26, 1920.

Application filed November 8, 1918. Serial No. 261,632.

*To all whom it may concern:*

Be it known that I, EMIL F. NORELIUS, a citizen of the United States, residing at Peoria, in the county of Peoria and State of Illinois, have invented a new and useful Improvement in Transmission Mechanism, of which the following is a specification.

This invention relates to a motor vehicle construction and particularly pertains to a steering transmission for tractors.

The present invention is concerned with a driving and steering means for tractors, similar in operation to that disclosed in my co-pending application entitled Tractor transmission and which bears the filing date Sept. 17, 1918, and Ser. No. 254,443.

In transmission mechanisms of this particular type, it is desired to provide uninterrupted driving means for independently actuating the two driving units of a tractor and to furthermore provide power driven means adapted to be selectively controlled to vary the relative speeds of the two traction units, thereby eliminating the use of friction brakes and clutches and insuring that the steering of the vehicle may be effected with a minimum loss of power incident to the steering operation.

The present invention contemplates the use of a main driving shaft adapted to be driven at variable speeds through a set of speed changing gears and to impart motion to separately operated driving units, said main shaft being furthermore adapted to drive means for producing variable speeds of rotation for the two traction units driven thereby.

The invention is illustrated by way of example in the accompanying drawings in which—

Figure 1 is a view in side elevation, illustrating a completely assembled tractor upon which the transmission mechanism is utilized, the view further disclosing parts as broken away for the sake of clearness and convenience.

Fig. 2 is a view in longitudinal section as seen centrally of the transmission mechanism, particularly disclosing the speed changing gears and the steering clutches.

Fig. 6 is a view in plan, illustrating the transmission mechanism as dissociated from the traction units and with parts broken away to disclose a modified form of steering transmission.

Figure 5:
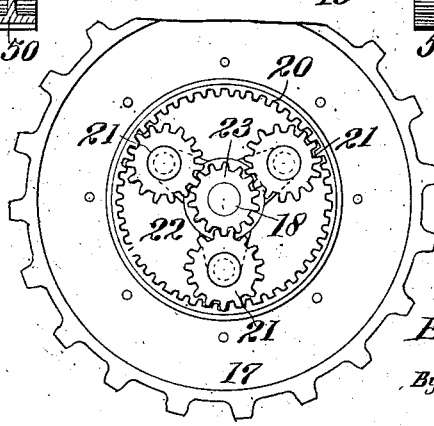
Fig. 5 is a view in end elevation, disclosing one of the traction driving sprockets and the planetary gear arrangement in the end thereof.

Referring more particularly to the drawings, 10 indicates a tractor main frame at the opposite sides of which are positioned truck roller frames 11. These frames are yieldably mounted to support the main frames by means of an equalizer mechanism 12 at their forward ends and spring members 13 interposed between their rear ends and the frame. As is customary, the frame members 11 provide mountings for load supporting rollers 14, which, in turn, bear upon the lower run of a track chain 15. The forward ends of the truck roller frames are fitted with idler sprockets 16, around which the chains pass while the opposite end of the chain passes around the driving sprockets 17. These sprockets are provided with their rotating axes in fixed relation to an axle 18, which is mounted transversely of the main frame and is rotatably supported within a transmission case 19. Each of these sprockets is formed with an internal ring gear 20, as particularly shown in Fig. 5. These gears are in constant mesh with a plurality of small planetary gear pinions 21, which are mounted for independent rotation upon the several arms of a gear spider 22. The gear spiders are free to rotate around the axis of the axle 18 and support the pinions 21 in mesh with the ring gears 20 and driving gears 23. These last named gears are fixed to the opposite ends of the axle 18 and impart motion to the sprockets from this axle.

The axle 18 is driven by a bevel driving gear 24, which is keyed upon it at a point substantially at its middle. This driving gear is in mesh with the bevel pinion 25 fixed to the end of a counter shaft 26. As shown in Fig. 2, the counter-shaft is rotatably supported within the bottom of the transmission case 19 and extends parallel to the main drive shaft 27, beneath which it is positioned. The counter-shaft 26 carries a series of gears of different diameters, which are designed to mesh with complementary gears upon the driving shaft 27. It will be understood that the gears upon the shaft 27 are free to slide, as actuated by a shifting yoke 28, and it will be further evident that the selective meshing of these gears will produce variation in speed ratios between the main shaft 27 and the counter-shaft 26.

The shafts 26 and 27 and their gears represent the usual speed changing transmission mechanism with which vehicles are equipped. The present invention is more particularly concerned with a steering means partially mounted upon an extension of the shaft 27, the remainder being in operative connection therewith. As clearly shown in Fig. 2, it will be seen that spiral gears 29 and 30 are mounted upon the shaft 27 and are directly carried by separate sleeves 31 and 32. The opposite ends of these sleeves are enlarged or otherwise integrally united with members to provide cone clutch members 33 and 34. These parts of the clutches are cup-shaped and are adapted to receive sliding cone clutches 35 and 36. The sliding cones are splined to the main shaft 27 and may be alternately shifted to engage their respective clutch cups by means of shifting yokes 37. These yokes may be controlled by a swinging lever 38, extending upwardly from the gear case, as shown in Fig. 1, and which is connected by a link 39 with a short lever 40, thus completing the operative mechanism for both of the yokes as they are mounted upon their shafts 41 and 42. The connecting rod 39 also accomplishes another function which will be hereinafter disclosed.

Figure 3:
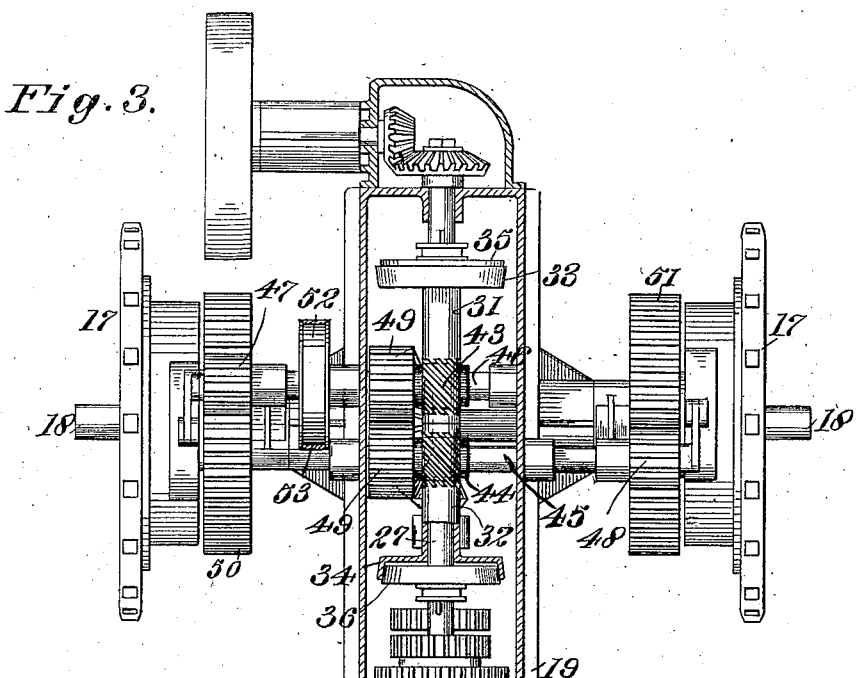
Fig. 3 is a fragmentary view and plan, illustrating the complete transmission mechanism with parts removed, to more clearly disclose the relation of the driving shafts with the axle of the separate traction units.
Figure 4:
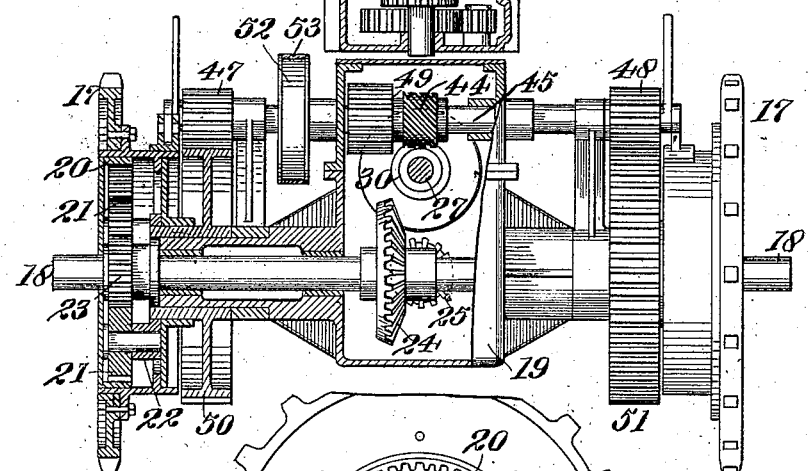
Fig. 4 is a view in transverse section and elevation, disclosing the driving axle of the traction units and the power transmission means in connection therewith.

The worm gears 29 and 30 are in constant mesh with worm gears 43 and 44 respectively, these being fixed upon shafts 45 and 46. The shafts 45 and 46 extend at right angles to the main shaft 27 and are arranged in parallel relation to each other, as shown in Fig. 3. The shaft 46 extends outwardly through the lefthand side of the gear case, within which it is provided with suitable bearings and is fitted at its outer end with the driving pinion 47. The shaft 45 extends oppositely through the right-hand side of the gear case and it is fitted at its outer end with driving pinion 48. Within the case each of these shafts is provided with spur gears 49, which are in constant mesh and which insure that rotation of one shaft in one direction will produce rotation of the other shaft in the opposite direction simultaneously. The gears 47 and 48 are in constant mesh with large spur gears 50 and 51 respectively, particularly shown in Fig. 4 as being free to rotate around tubular extensions of the transmission case. The hubs of these gears also carry the planetary gear spiders 22 and thus insure that rotation of either of the gears 50 or 51 will produce simultaneous rotation of the gear spider carried thereby and thus effect a movement of the planetary gear pinions 21 in relation to the ring gears 20 and the driving pinions 23, which are carried upon the ends of the axle 18.

It is desired to normally hold the two shafts 45 and 46 against rotation and this is accomplished by means of a brake drum 52, which is here shown as keyed to the shaft 46. This drum is provided with a brake band 53, adapted to be expanded and contracted by the oscillation of a lever 54, which is connected with the rod 39 and will therefore swing in unison with the levers 38 and 40. A block 55 is interposed between the brake band and the lever 54 in a manner to insure that the band will be released when either of the cone clutch members 35 and 36 is in driving engagement with its complementary member 33 or 34.

In a modified form of the invention, as shown in Fig. 6, it will be noted that the entire axle structure is contracted and that the gears 47, 48, 50 and 51 are disposed within the transmission case, thus completely housing these gears and protecting them from dust. The operation and details of construction are, however, identical with that previously disclosed.

In operation of the present invention, the main shaft 27 is driven by any suitable source of supply such as the internal combustion engine, as indicated in Fig. 1. By shifting the sliding gears upon shaft 27, the counter shaft 26 will be driven at any desired speed of rotation. This driving action will be imparted to the axle 18. Rotation of the sprockets 17 will be effected through the rotation of the pinions 23 on the ends of the driving axle as they tend to drive the planetary pinions 21, and thereafter the ring gears 20, it being understood that under normal conditions the spiders of the pinions are locked against rotation by the brake 52. When it is desired to change the course of travel of the vehicle, the lever 38 is shifted either forwardly or rearwardly. When shifted forwardly, the yokes 37 will swing to move the clutch cone 35 away from its complementary member and the cone 36 into engagement with the member 34. As these cones are splined upon the shaft 27, the sleeve 32 will thus be locked to rotate with this shaft and motion will be imparted to the steering shaft 45 in the direction indicated by arrow $a$ in Fig. 2. As the shafts 45 and 46 are connected by gears 49, they will rotate simultaneously, the one in the direction of arrow $a$ and the other in the direction of arrow $b$.

Simultaneous with this rotation, the brake drum 52 will be released to permit these shafts to rotate and will therefore allow the gears 50 and 51 to be driven in opposite directions at a uniform rate of speed. The normal speed of gear 50 will be accelerated and its acceleration will be added to the driving speed of the planetary pinions carried by the spider of this gear, thus increasing the speed of the sprocket driven by these pinions. At the same time, the opposite sprocket, due to a reversal in operation, will decrease in speed of rotation a degree corresponding to the increase in speed of the first main sprocket.

Thus it will be observed that the longitudinal axis of the vehicle is traveling at its normal speed while the traction unit on the inner side of the turn is slowed down and the traction unit on the outer side of the turn is accelerated, thus causing the vehicle to pursue an arcuate course of travel. The radius of this arc will be dependent upon the rate of speed at which the vehicle is traveling and will therefore be affected by a shifting of the speed changing gears upon the shafts 26 and 27. If the shifting lever 38 is drawn rearwardly, a reverse operation would be effected and the vehicle would turn to the opposite side of the roadway. Due to the similarity in construction between the invention as shown in Figs. 1 to 5 inclusive, and that shown in Fig. 6, it is believed that a further discussion of the operation is unnecessary.

While I have shown the preferred form of my invention, it will be understood that various changes in the combination, construction and arrangement of parts may be made by those skilled in the art, without departing from the spirit of the invention as claimed.

Having thus described my invention, what I claim and desire to secure by Letters Patent is—

1. A power transmission mechanism comprising a drive shaft, an axle driven therefrom, a transmission housing through which the axle is rotatably secured, sprockets freely mounted to rotate around the opposite ends of the axle, driving pinions upon the axle, internal gears carried by the sprockets, planetary gears in mesh with the internal gears and the pinions on the axle and reversible driving means carried by the main shaft, adapted to affect the separate sets of planetary gears to produce variation in the speeds of rotation of the sprockets and means for normally locking said speed varying means against rotation.

2. A power transmission mechanism comprising a main shaft, a drive shaft, gear means for rotating the drive shaft at variable speeds as driven by the main shaft, a driving axle adapted to rotate in unison with the drive shaft, sprockets rotatable around the opposite ends of the axle, a gear case providing a bearing support for the axle, spur gears carried by the axle ends, internal gears carried by the sprockets, sets of planetary gears in constant mesh with both of said gears, freely rotatable gear spiders for supporting said planetary gears, spur gears fixed to rotate around the axle bearings of the transmission case and to carry the gear spiders, pinions meshing with said spur gears, separate shafts carrying the pinions and means for selectively driving said pinions simultaneously in either direction to affect the planetary gears and produce a desired variation in the driving speeds of the two sprockets.

3. A power transmission mechanism comprising a main shaft, a drive shaft, gear means for rotating the drive shaft at variable speeds as driven by the main shaft, a driving axle adapted to rotate in unison with the drive shaft, sprockets rotatable around the opposite ends of the axle, a gear case providing a bearing support for the axle, spur gears carried by the axle ends, internal gears carried by the sprockets, sets of planetary gears in constant mesh with both of said gears, freely rotatable gear spiders for supporting said planetary gears, spur gears fixed to rotate around the axle bearings of the transmission case and to carry the gear spiders, pinions meshing with said spur gears, separate shafts carrying the pinions and means for selectively driving said pinions simultaneously in either direction to affect the planetary gears and produce a desired variation in the driving speeds of the two sprockets and means for normally locking said last-named means against rotation.

4. A power transmission mechanism comprising a main shaft, a drive shaft, gear means for rotating the drive shaft at variable speeds as driven by the main shaft, a driving axle adapted to rotate in unison with the drive shaft, sprockets rotatable around the opposite ends of the axle, a gear case providing a bearing support for the axle, spur gears carried by the axle ends, internal gears carried by the sprockets, sets of planetary gears in constant mesh with both of said gears, freely rotatable gear spiders for supporting said planetary gears, spur gears fixed to rotate around the axle bearings of the transmission case and to carry the gear spiders, pinions meshing with said spur gears, separate shafts carrying the pinions, driving means freely rotating upon the main shaft and in constant engagement with said pinion shafts and clutch members adapted to selectively lock
5 one of said driving members in relation to the main shaft to produce a desired rotation of the pinion shafts.

In testimony whereof I have hereunto set my hand in the presence of two subscribing witnesses.

EMIL F. NORELIUS.

Witnesses:
AUG. SCHNEIDER,
CHAS. M. FORESMAN.